(12) United States Patent
Awe et al.

(10) Patent No.: US 6,509,906 B1
(45) Date of Patent: Jan. 21, 2003

(54) DISPLAY REPRESENTATIONS AND STREAMS FOR OBJECTS HAVING AUTHORABLE AND DYNAMIC BEHAVIORS AND APPEARANCES

(75) Inventors: James Matson Awe, Bedford, NH (US); Marc Wagner Schindewolf, Hopkinton, NH (US); Chad Steven Ames, Bedford, NH (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/302,146

(22) Filed: Apr. 29, 1999

(51) Int. Cl.[7] .................................................. G09G 5/00
(52) U.S. Cl. ........................ 345/619; 345/589; 345/635
(58) Field of Search ................................. 345/589, 619, 345/635, 961, 964; 700/182

(56) References Cited

U.S. PATENT DOCUMENTS

| 5,572,639 A | 11/1996 | Gantt |
| 5,627,949 A | 5/1997 | Letcher, Jr. |
| 5,745,751 A | * 4/1998 | Nelson et al. ............... 345/961 |
| 5,903,278 A | * 5/1999 | Mitchell et al. ............ 345/589 |

* cited by examiner

*Primary Examiner*—Michael Razavi
*Assistant Examiner*—Faranak Fouladi
(74) *Attorney, Agent, or Firm*—Gates & Cooper LLP

(57) ABSTRACT

A method, apparatus, and article of manufacture for enabling the creation of authorable, dynamic software objects. An apparatus made in accordance with the present invention comprises a computer and an attached monitor, stream means, display property means, display representation means, and display configuration means. The stream means is performed by the computer and accepts at least one graphic primitive into the software object. The display property means is performed by the computer and stores at least one quality associated with each graphic primitive in the software object. The display representation means is performed by the computer and graphically represents a selected set of display properties of the software object. The display configuration means is performed by the computer and selectively displays one of the sets of graphical representations of the software object on the monitor of the computer.

33 Claims, 7 Drawing Sheets

DISPLAY REPRESENTATIONS AND STREAMS FOR OBJECTS HAVING AUTHORABLE AND DYNAMIC BEHAVIORS AND APPEARANCES

BACKGROUND OF THE INVENTION

1. Field of the Invention

The present invention relates generally to software objects, and in particular, to a method, apparatus, and article of manufacture for providing display representations and streams for objects with authorable and dynamic behaviors and appearances for computer programs.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and do little to help the user connect standard CAD components, define new components, or define methods of manipulating the components within the CAD program.

Most standard components are predefined by the CAD program itself, leaving little room for the user to define custom shapes without using the predefined standard components as building blocks. A user must manipulate standard components to define a shape or outline, place them spatially proximate on a working screen, and then group them together using a grouping or wrapping function. This multiple step approach of dragging components onto the screen and then modifying the components to create a new shape or outline within a document is inefficient and time consuming.

As an example, traditional CAD systems have produced drawings out of primitive geometric shapes like Lines, Arcs, or Circles. However, plans for a typical building would consist of many separate drawings, each one showing a different "view" or "representation" of the building. Each one of these representations is tailored to communicate different types of information to the reader and these representations have become standardized in the United States Architecture and Construction community because of their longstanding use. However, standardized symbols used in the United States are either modified or mean different things when the drawings are used internationally, making work on international construction projects difficult.

Recently, object-oriented CAD systems have been introduced that allow for geometric primitives at a higher level than Line, Arc, and Circle. It is now possible to introduce a single object into the drawing, such as a door, which is capable of drawing itself in different ways when asked to do so. While this might be enough to satisfy simple changes, it is not extensible enough to allow a single building model to be constructed and viewed around the world. In addition, each object has to respond to other "graphic" requests from the CAD system besides just drawing itself. For example, the CAD system will want to know object snap points, object intersection points, the volume of an object, what an object looks like in various cross-sections, and the contents of a given high level object, e.g., the primitive Lines, Arcs, and Circles that could be used to represent this in the absence of the object itself.

These requirements make adding a new display representation extremely expensive because, for each representation, every object must account for every other object's behavior in the CAD system. Further, new display representations are typically not customizable by users or other software developers.

Consequently, there is a need in the art for improved techniques for creating components in a CAD program, in order to create documents faster. Further, there is a need in the art for techniques for direct manipulation of software objects. There is also a need in the art for representing the same object in different views for related CAD drawings.

SUMMARY OF THE INVENTION

To address the requirements described above, the present invention discloses a method, apparatus, and article of manufacture for enabling the creation of authorable, dynamic software objects. An apparatus made in accordance with the present invention comprises a computer and an attached monitor, stream means, display property means, display representation means, and display configuration means. The stream means is performed by the computer and accepts at least one graphic primitive into the software object. The display property means is performed by the computer and stores at least one quality associated with each graphic primitive in the software object. The display representation means is performed by the computer and graphically represents a selected set of display properties of the software object. The display configuration means is performed by the computer and selectively displays one of the sets of graphical representations of the software object on the monitor of the computer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a software system that enables the creation and maintenance of relationships between properties of objects, wherein the objects can be authored and dynamically altered by a user. The present invention comprises a method, apparatus, and article of manufacture for enabling the creation of authorable, dynamic software objects. An apparatus made in accordance with the present invention comprises a computer and an attached monitor, stream means, display property means, display representation means, and display configuration means. The stream means is performed by the computer and accepts at least one graphic primitive into the software object. The display property means is performed by the computer and stores at least one quality associated with each graphic primitive in the software object. The display representation means is performed by the computer and graphically represents a selected set of display properties of the software object. The display configuration means is performed by the computer and selectively displays one of the sets of graphical representations of the software object on the monitor of the computer.

Hardware Environment

Figure 1:
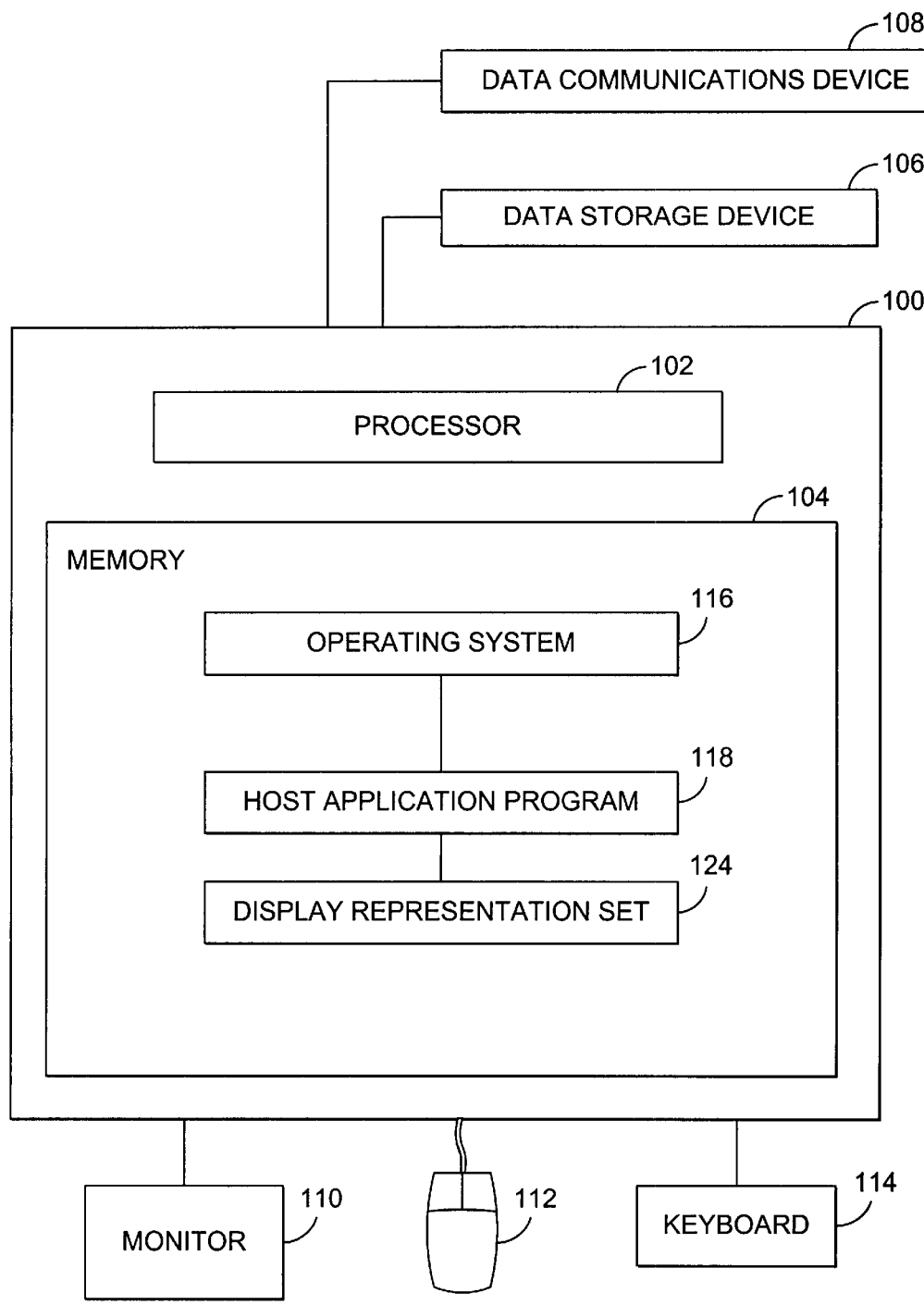
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more host application programs 118 that operate under the control of the operating system 116. The display representation sets 124 are usually part of a CAD program 118 or other graphics program, but can stand alone as shown in FIG. 1.

Generally, the CAD program 118 and display representation sets 124 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention.

Any combination of the above components, or any number of different components, including computer programs, peripherals, and other devices, may be used to implement the present invention, so long as similar functions are performed thereby.

The present invention is applicable to any software object that can be created by an author. However, for ease of understanding of the present invention, an example using related objects typically used in architectural and construction drawings will be provided herein to illustrate the present invention. The object example provided below is not intended to limit the scope of the present invention.

Authorable Dynamic Software Objects

Figure 2:
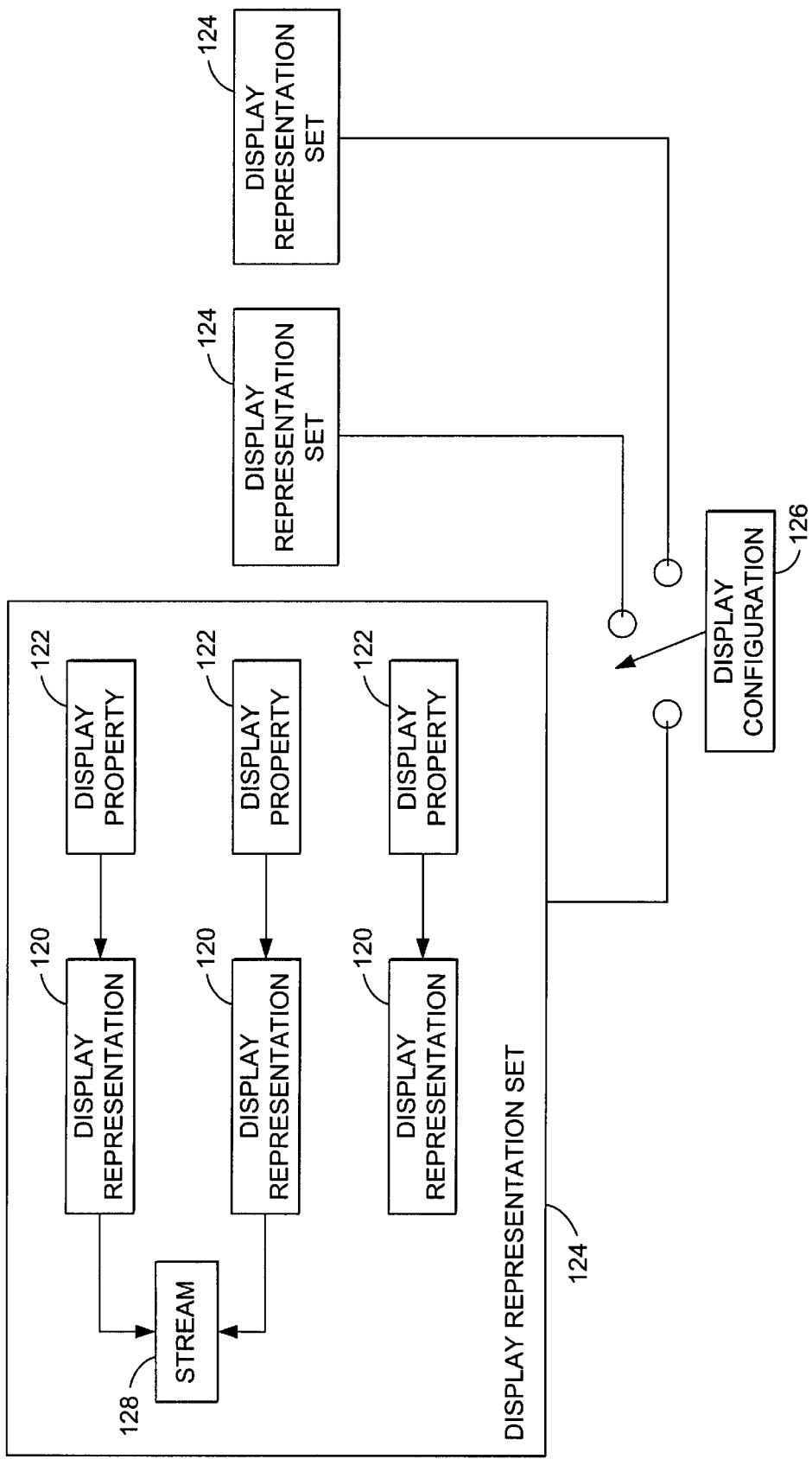
FIG. 2 is a block diagram that illustrates the interrelationships between the software objects of the present invention.

FIG. 2 is a block diagram that illustrates the interrelationships between the software objects of the present invention. The main elements of the present invention are display representation 120 objects, display properties 122, display representation sets 124, display configurations 126, and streams 128.

Display Representations

A display representation 120 is a software object that is responsible for a single graphical representation of a CAD object. For example, plan view 300 is a display representation 120, model view 302 is a different display representation 120, and elevation view 304 is yet another different display representation 120.

Display Properties

A display property 122 is a software object that is paired up with each display representation 120. A display property 122 can be paired up with more than one display representation 120. The display property 122 object stores graphic primitive or component information for each graphic primitive or component within the display representation 120. Display property 122 infonnation includes Layer, Color, Linetype, Visibility, etc. for each component within the software object being displayed in the display representation 120. For example, the plan view 300 of the door would show the swing (the arc) of the door as visible, while the model view 302 would show the swing of the door as invisible. New display representations 120 of a software object can also introduce a corresponding display property 122 object to store any data that may be unique to their representation. With this combination of extendable object properties and extendable object display representations 120, there are an infinite number of representations of a given object, all using the identical data model object.

Display Representation Sets

A display representation set 124 is a software object comprising a collection of display representations 120. Typically, the user selectively groups display representations 120 for various software objects into a "package" that makes sense to be viewed together. For example, all "2D-floor-plan" display representations 120 of objects would normally be grouped into a "plan" display representation set 124. In that way, all objects are communicating the same type of information when viewed together (e.g., walls, doors, and windows, all showing "floor-plan" information). However, any display representation 120 object can be grouped with any other display representation 120 object in a display representation set 124. It may be desirous to highlight or emphasize certain objects for various reasons, e.g., dramatic effect, perspective, etc.

Display Configurations

A display configuration 126 is a software object that is attached to a drawing and determines which display representation set 124 or sets 124 are supposed to be drawn. The display configuration 126 for a drawing can change depending on the viewing direction or angle of the drawing, or can be fixed for any viewing angle. For example, a "fixed" display configuration 126 simply sets a given display representation set 124 for the drawing, e.g., the "plan" display representation set 124, the "model" display representation set 124, a custom display representation set 124, etc. However, a drawing can also switch between display representation sets 124 depending on view-direction or other user identifiable dependent configuration that will switch between display representation sets 124 based on the current viewing direction on the monitor 110. For instance, if the viewing direction is looking straight down, it might choose the "PLAN" display representation set 124, if it is looking straight in front, it might choose the "ELEVATION" display representation set 124, and any other angle might choose the "3D-MODEL" display representation set 124.

Streams

Figure 3:
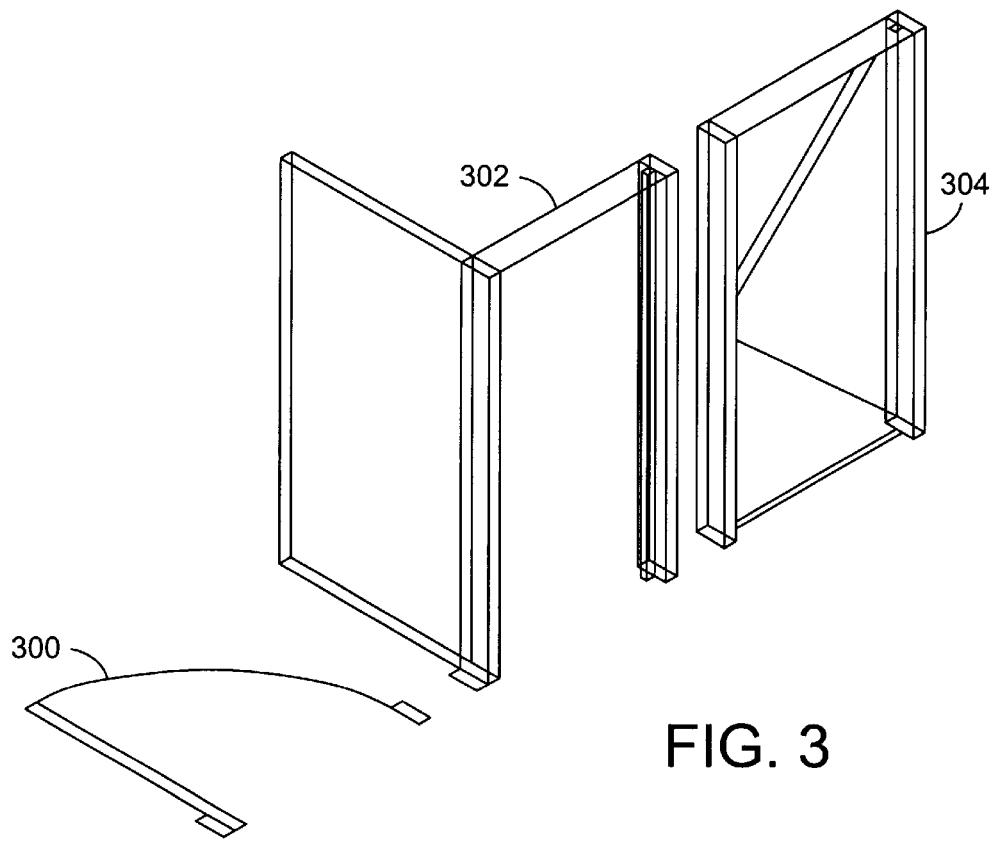
FIG. 3 shows different representations of an object as used by the present invention.
Figure 4:
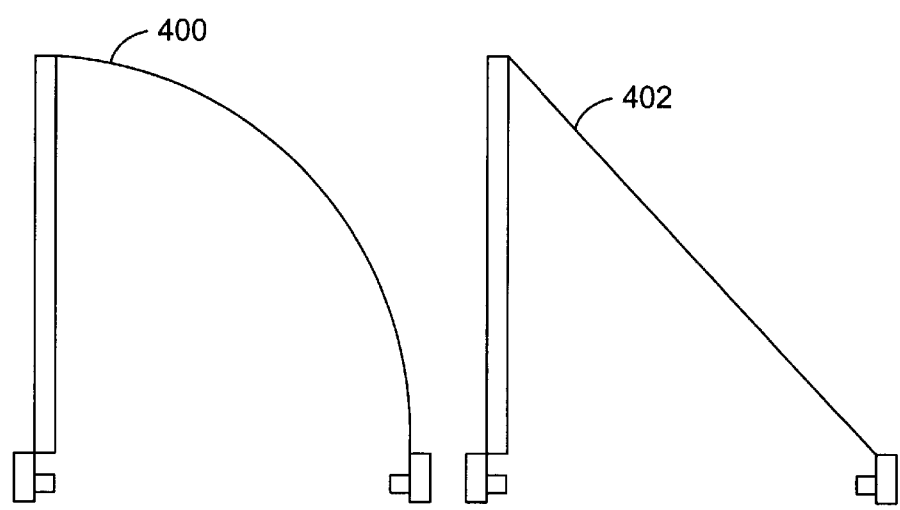
FIG. 4 illustrates different versions of the same object as used in the present invention.
Figure 5:
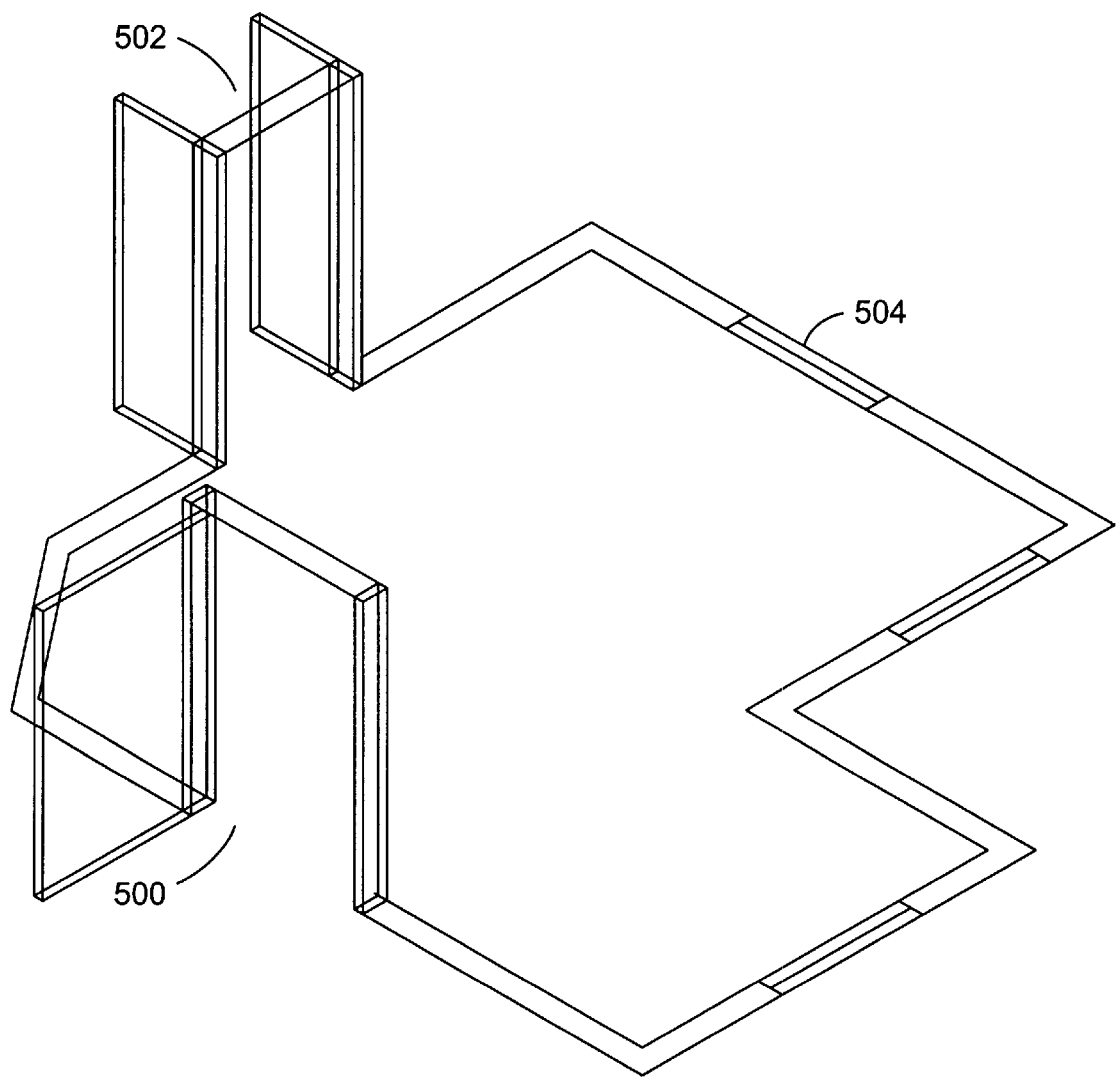
FIG. 5 illustrates a plan view drawing created by using display representation sets of the present invention.

Streams 128 are a series of objects that are designed to accept graphic primitives from a CAD object and do something specific with those graphics. Each derived stream 128 is optimized for its intended purpose. As an example, AecStreamAcGi will accept geometric and graphics primitives and map them to the set of available graphics that can be accepted by a graphics window. Because some graphics windows will not accept certain primitives, such as an an ellipse, a stream 128 will break the primitive "ellipse" down into line segments and send those to the graphics window. However, a different stream 128 will accept the same ellipse and run an intersection algorithm on the original ellipse without breaking it down into vectors. the streams 128 of the present invention provide benefits to developers, because the developer can remain focused on the graphics for their particular display representation 120, and not be distracted by any intended usage of the graphics primitives. FIGS. 3–5 provide additional illustrations of display representations 120 as well as other features of the present invention.

FIG. 3 shows different representations of an object as used by the present invention.

Plan view 300 illustrates a door that is typically drawn on a "plan" view or outline view of a building. Plan view 300 is an isometric view of a door's footprint on the floor, and shows the door swing radius, the door width, etc. in perspective with other features drawn on a plan view.

Model view 302 illustrates the same door that was drawn in plan view 300. However, model view 302 shows an isometric view of the door in three dimensions, showing the door height, the door jamb, etc., and other features usually associated with model view architectural drawings.

Elevation view 304 illustrates the same door that was drawn in plan view 300 and model view 302. Elevation view 304 provides information about the door that is typically used on elevation view architectural drawings.

The traditional method uses three separate objects to draw the same door on three separate architectural drawing types. If a designer wanted to change the width of the door, then each drawing of the door, e.g., plan view 300, model view 302, and elevation view 304 would have to be changed separately. The present invention, however, allows a change in one view to be propagated to all views, e.g., a change in plan view 300 will be propagated to model view 302 and elevation view 304 to allow the related drawings to continue to correspond to each other.

FIG. 4 illustrates different versions of the same object as used in the present invention.

Although drawing symbolism has been standardized throughout the United States, many projects are performed internationally, as well as joint projects between multiple countries. Since United States drawing symbolism may not translate to other countries directly, or create confusion, the present invention allows for multiple representations of the same software object.

As a simple example, in the United States, door swing 400 is shown with an arc to show the area of space taken up by opening and closing the door. However, in Germany, door swing 402 lines are shown with a straight line. The difference in symbology between door swing 400 and door swing 402 creates confusion, and more complicated differences in symbology could create errors during the construction phase of a building. This differing symbolism makes work on international projects very difficult, because an American architect will not necessarily be speaking the same "graphic language" as the foreign contractor.

FIG. 5 illustrates a plan view drawing created by using display representation sets of the present invention. As seen in FIG. 5, model view 500 of a single door and model view 502 of a double door are included on plan view 504 of an outline of a room. This emphasis of model view 500 and model view 502 shows a designer or user of the drawing in more detail what the doors to the plan view 504 outline will do in terms of space, etc.

The present invention extends advantages to CAD users because third parties can use the display representation 120 and display representation sets 124 to solve specific problems in any locale. Further, data inter-operability is maintained by keeping one object-oriented building model where the physical properties of the model are separate from the graphical properties. As an example, a door is a door with a certain height, width, and shape, no matter where it is physically in the world. However, its graphical appearance varies greatly depending on where and how it is being viewed, and different display representations 120 can be used to draw the door depending on what country a designer is in or what country the drawing is going to be sent to.

The streams 128 are able to leverage graphic output for many uses, which reduces the development cost of adding new representations for objects. The system also takes care of a user interface for newly created display representations.

Creating a Display Representation Set

Figure 6:
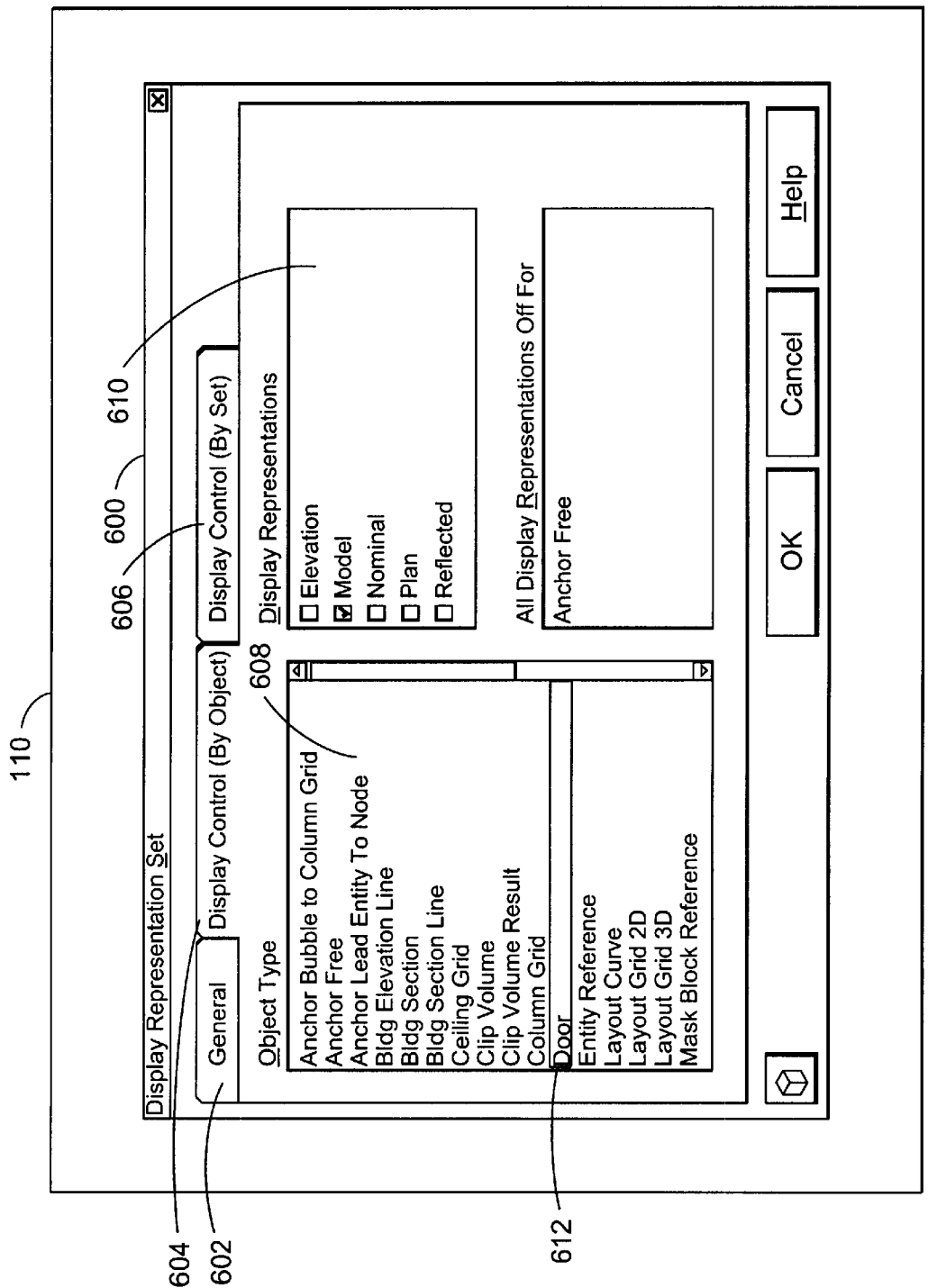
FIG. 6 illustrates a window used to create different representation sets within the present invention.

FIG. 6 illustrates a window used to create different representation sets within the present invention. Window 600 displayed on monitor 110 illustrates several qualities of the display representation 120 and the display representation set 124 of the present invention. The present invention allows for custom combinations of display representations 120 to form unique results that may not have necessarily been anticipated by developers ahead of time. Since more than one display representation 120 can be drawn for a given object at the same time, developers can produce "collaborative" representations that work together when the user turns more than one display representation 120 on in a given display representation set 124.

As shown in FIG. 6, window 600 contains tabs 602, 604, and 606 to allow the user to customize the display of each object used in the display representation set 124. Pane 608 lists the objects available in display representation set 124, and pane 610 allows the user to select which display representation 120 is used for used each object listed in pane 608. Object 612, in this case, a door object 612, is highlighted to show that it has been selected by the user in pane 606. In pane 610, the model display representation 120 for door object 612 has been selected by the user. Multiple display representations 120 can be selected to provide a custom display representation set 124, or a different display representation 120 for each object in pane 606 can be selected to provide a custom display representation set 124.

Figure 7:
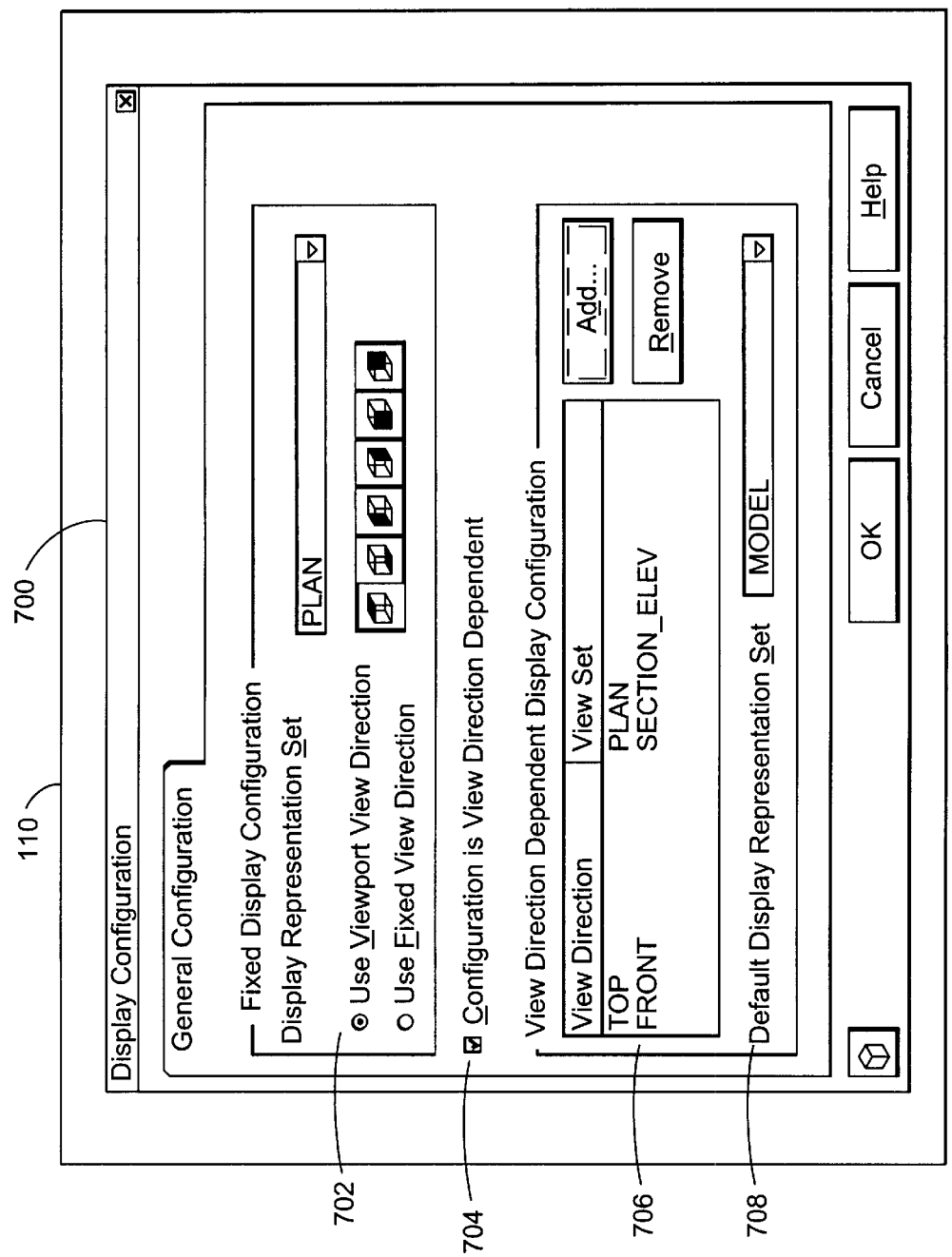
FIG. 7 illustrates a window used for the creation of display configurations for the present invention.

FIG. 7 illustrates a window used for the creation of display configurations for the present invention.

Window 700 displayed on monitor 110 illustrates the tools used to create a display configuration 126 for the present invention. Pane 702 is used for fixed display configurations 126, where the display representation 120 remains constant for all viewing angles and other dependent variables used for the drawing. Check box 704 allows the selection or deselection of view direction or other dependent display configurations 126. An example of a non-viewing angle dependent display configuration 126 is one that is dependent on layers. Objects can be drawn in layers, e.g., doors drawn on layer 1, walls on layer 2, etc. and the display configuration 126 can be layer-dependent instead of view direction dependent.

Pane 706 allows the user to describe which display representation set 124 is used for each viewing angle. As shown, when the view direction is from the top, a plan display representation set 124 is used, whereas when the view direction is from the front, a section$_{13}$ elevation display representation set 124. is used to draw the objects on the drawing. Pane 708 allows the user to define a default display representation set 124, in this case, the model display representation set 124.

Flowchart

Figure 8:
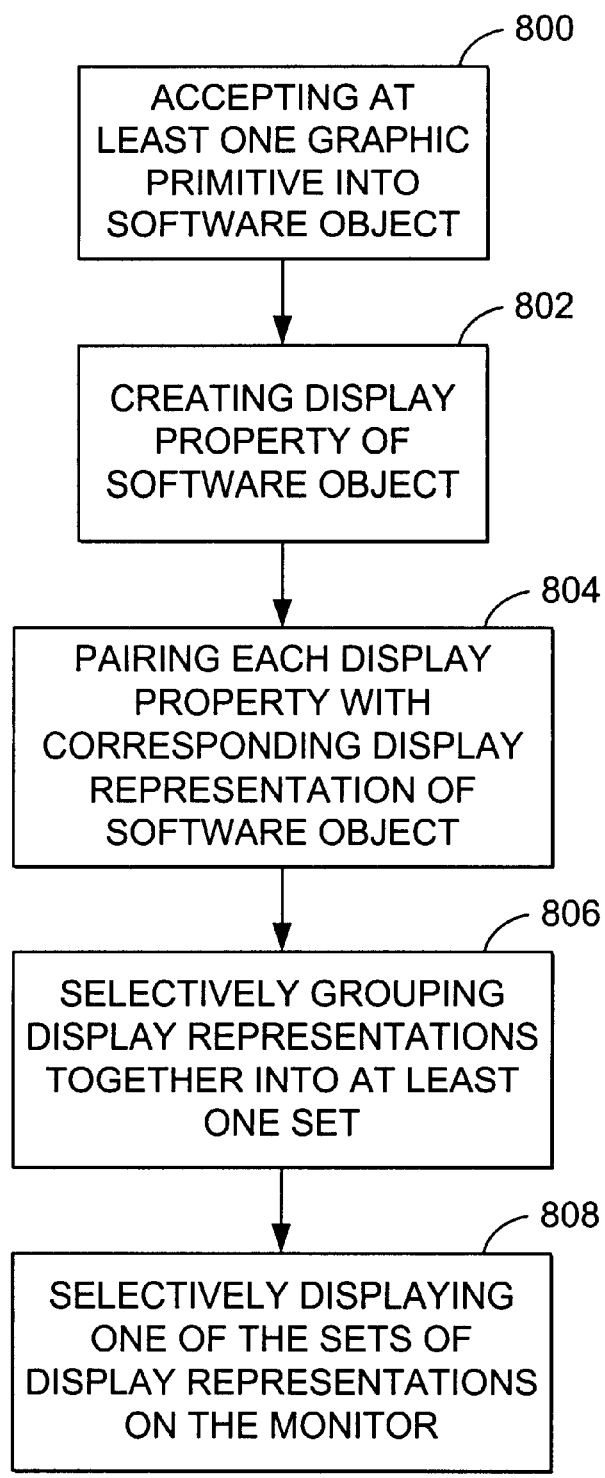
FIG. 8 is a flowchart that illustrates the general logic of performing the steps of the present invention.

FIG. 8 is a flowchart that illustrates the general logic of performing the steps of the present invention.

Block 800 represents the computer performing the step of accepting at least one graphic primitive into the software object.

Block 802 represents the computer performing the step of creating at least one display property of the software object.

Block 804 represents the computer performing the step of pairing each display property with a corresponding display representation of the software object.

Block 806 represents the computer performing the step of selectively grouping the display representations together into at least one set of display representations of the software object.

Block 808 represents the computer performing the step of selectively displaying one of the sets of display representations of the software object on the monitor.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

The above teaching also supports additional functions that may also be implemented using the authorable dynamic behaviors of the objects of the present invention.

In summary, the present invention discloses a method, apparatus, and article of manufacture for enabling the creation of authorable, dynamic software objects. An apparatus made in accordance with the present invention comprises a computer and an attached monitor, stream means, display property means, display representation means, and display configuration means. The stream means is performed by the computer and accepts at least one graphic primitive into the software object. The display property means is performed by the computer and stores at least one quality associated with each graphic primitive in the software object. The display representation means is performed by the computer and graphically represents a selected set of display properties of the software object. The display configuration means is performed by the computer and selectively displays one of the sets of graphical representations of the software object on the monitor of the computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of graphically representing a software object in a computer, comprising:
   creating a display representation object that comprises a graphical representation of the software object;
   creating at least one display property object, and pairing each display property object with a corresponding display representation object, wherein each display property object stores graphic primitive information for one or more graphic primitives of the corresponding display representation object;
   accepting, in one or more stream objects, at least one of the graphic primitives from the display representation object; and
   the one or more stream objects displaying the graphical representation of the software object based on the accepted graphic primitive.

2. The method of claim 1, wherein the display property object comprises a linetype, a color, a visibility, and a layer.

3. The method of claim 1, wherein the display representation set object comprises more than one type of display representation object.

4. The method of claim 1, further comprising selecting one of the display representation set objects based on a view direction of the software object.

5. The method of claim 1, wherein the display property object is paired with more than one display representation object.

6. A computer-implemented apparatus for displaying graphical representations of software objects, comprising.
   a computer having a monitor attached thereto;
   display representation object means, maintained by the computer, for maintaining a graphical representation of the software object;
   display property object means, maintained by the computer, that is paired with a corresponding display representation object means, wherein each display proper object means stores at least one quality associated with one or more graphic primitives of the corresponding display representation object means; and
   stream object means, maintained by the computer, for accepting at least one of the graphic primitives from the display representation object and displaying the graphical representation of the software object based on the accepted graphic primitive.

7. An article of manufacture comprising a computer program carrier readable by a computer and embodying one or more instructions executable by the computer to perform a method of displaying information on a monitor attached to the computer, the method comprising:

creating a display representation object that comprises a graphical representation of the software object;

creating at least one display property object, and pairing each display property object with a corresponding display representation object, wherein each display property object stores graphic primitive information for one or more graphic primitives of the corresponding display representation object;

accepting, in one or more stream objects, at least one of the graphic primitives from the display representation object; and the one or more stream objects displaying the graphical representation of the software object based on the accepted graphic primitive.

8. The method of claim 1, further comprising selectively grouping two or more display representation objects together into at least one display representation set object.

9. The method of claim 8, further comprising selectively displaying one or more of the display representation objects in the display representation set object together.

10. The method of claim 1, further comprising attach a specific viewport to a display configuration object, wherein the display configuration object determines which display representation set object to display in the specific viewport.

11. The method of claim 10, wherein the display configuration object is fixed such that the specific viewport always displays a particular display representation set object.

12. The method of claim 10, wherein display configuration object is view-direction dependent such that the display representation set object displayed is based on a current viewing direction in the viewport.

13. The method of claim 1, further comprising automatically integrating a new display representation object into an existing user interface.

14. The apparatus of claim 6, wherein the display property object means further comprises a linetype, a color, a visibility, and a layer.

15. The apparatus of claim 6, further comprising at least one display representation set object means comprising a selective grouping of two or more display representation object means.

16. The apparatus of claim 15, wherein one or more of the display representation object means in the display representation set object are selectively displayed together.

17. The apparatus of claim 16, wherein the display representation set object means is selected based on a view direction of the software object.

18. The apparatus of claim 15, wherein the display representation set object means comprises more than one type of display representation object means.

19. The apparatus of claim 6, wherein the display property object means is paired with more than one display representation object means.

20. The apparatus of claim 6, further comprising a display configuration object means that is attached to a specific viewport means, wherein the display configuration object means determines which display representation set object means to display in the specific viewport means.

21. The apparatus of claim 20, wherein the display configuration object means is fixed such that the specific viewport means always displays a particular display representation set object means.

22. The apparatus of claim 20, wherein the display configuration object means is view-direction dependent such that the display representation set object means displayed is based on a current viewing direction in the viewport means.

23. The apparatus of claim 6, wherein a new display representation object means is automatically integrated into an existing user interface.

24. The article of manufacture of claim 7, wherein the display property object comprises a linetype, a color, a visibility, and a layer.

25. The article of manufacture of claim 7, wherein the method further comprises selectively grouping two or more display representation set objects together into at least one display representation set object.

26. The article of manufacture of claim 25, wherein the method further comprises selective display one or more of the display representation objects in the display representation set object together.

27. The article of manufacture of claim 26, wherein the method further comprises select one of the display representation set object based on a view direction of the software object.

28. The article of manufacture of claim 25, wherein the display representation set object comprises more than one type of display representation object means.

29. The article of manufacture of claim 7, wherein the display property object means is paired with more than one display representation object.

30. The article of manufacture of claim 7, wherein the method further comprises attaching a specific viewport to a display configuration object, wherein the display configuration object determines which display representation set object to display in the specific viewport.

31. The article of manufacture of claim 30, wherein the display configuration object is fixed such that the specific viewport always displays a particular display representation set object.

32. The article of manufacture of claim 30, wherein the display configuration object is view-direction dependent such that the display representation set object displayed is based on a current viewing direction in the viewport.

33. The article of manufacture of claim 7, wherein the method further comprises automatically integrating a new display representation object into an existing user interface.

* * * * *

UNITED STATES PATENT AND TRADEMARK OFFICE
CERTIFICATE OF CORRECTION

PATENT NO. : 6,509,906 B1
DATED : January 21, 2003
INVENTOR(S) : James Matson Awe, Marc Wagner Schindewolf and Chad Steven Ames It is certified that error appears in the above-identified patent and that said Letters Patent is hereby corrected as shown below:

<u>Column 8,</u>
Lines 42 and 45, "1" should read -- 8 --
Line 52, "." (period) should read -- : -- (semicolon)
Line 60, "proper" should read -- property --

<u>Column 9,</u>
Line 27, "attach" should read -- attaching --

<u>Column 10,</u>
Line 31, "select" should read -- selecting --

Signed and Sealed this

Nineteenth Day of August, 2003

JAMES E. ROGAN
*Director of the United States Patent and Trademark Office*